(No Model.)
W. H. GRAY.
PULLEY AND BELT SHIPPER FOR MACHINERY.
No. 320,434. Patented June 16, 1885.
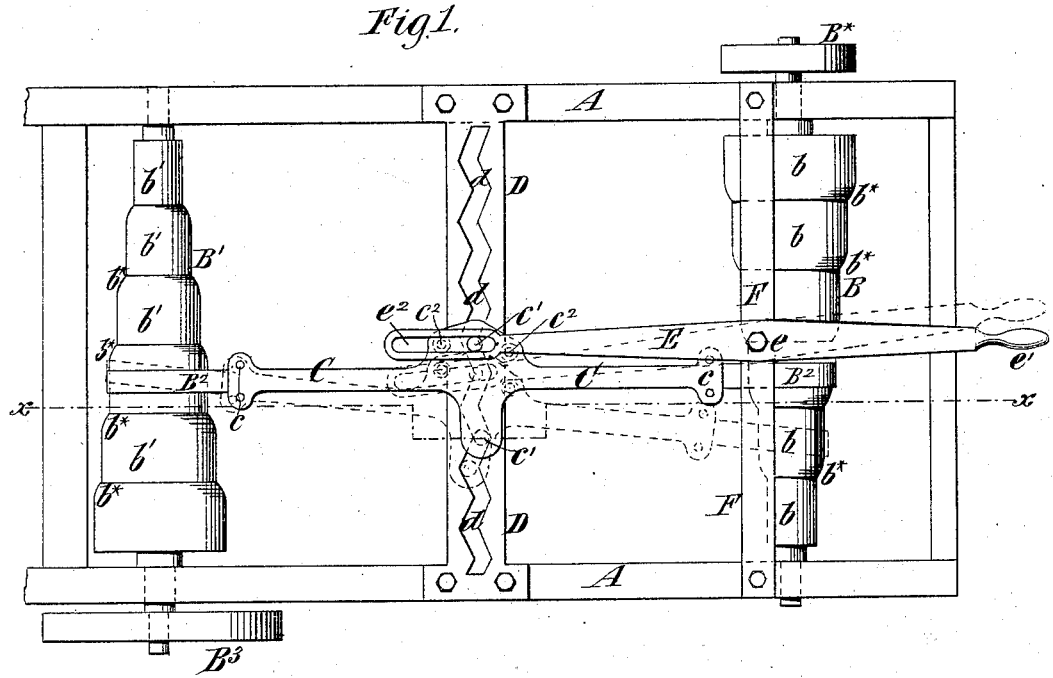
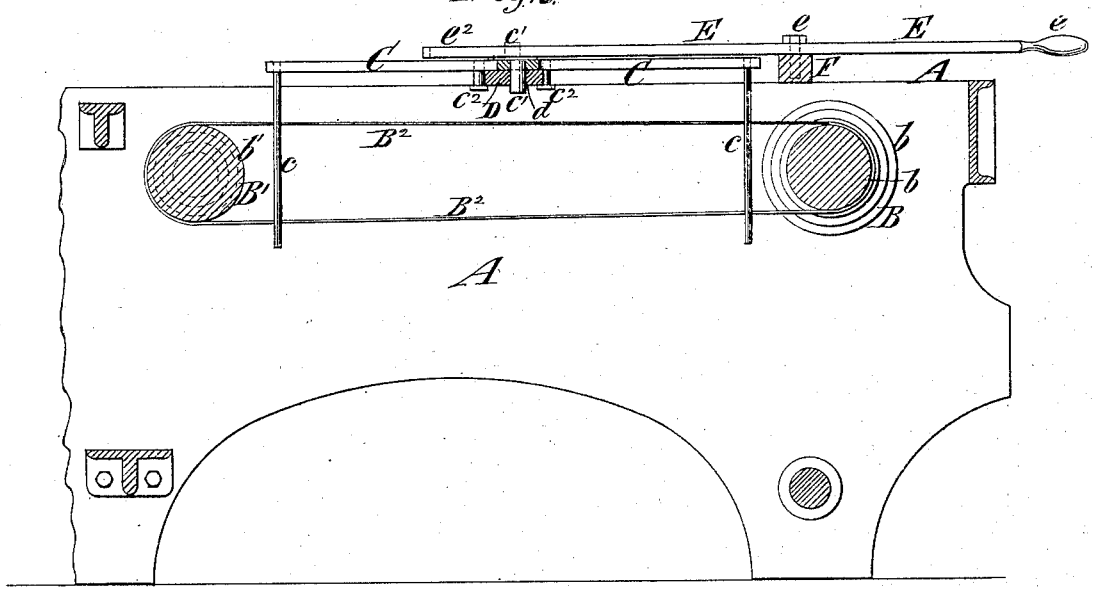
Witnesses:
Emil Herter
C. Sundgren
Inventor
Wm. H. Gray.
by his Attys
Brown & Hall

UNITED STATES PATENT OFFICE.

WILLIAM H. GRAY, OF BROOKLYN, NEW YORK, ASSIGNOR TO THE GLEN COVE MACHINE COMPANY, (LIMITED,) OF SAME PLACE.

PULLEY AND BELT-SHIPPER FOR MACHINERY.

SPECIFICATION forming part of Letters Patent No. 320,434, dated June 16, 1885.

Application filed May 11, 1885. (No model.)

*To all whom it may concern:*

Be it known that I, WILLIAM H. GRAY, of Green Point, Brooklyn, in the county of Kings and State of New York, have invented a new and useful Improvement in Pulleys and Belt-Shippers for Machinery, of which the following is a specification.

My invention is more particularly invented for shifting those belts in wood-planing machines through which motion is imparted to the feed-rolls, whereby provision is afforded for driving said rolls at variable speeds to suit the quality of lumber, and the thickness of cut being taken by the cutters; but the invention may also be embodied in other machinery where a driving-belt is to be shifted upon a pair of reversely-set cone-pulleys, in order to vary the speed of rotation of one of said pulleys.

The invention particularly relates to belt-shippers employed in connection with stepped cones or cones of pulleys; and the object of the invention is to provide for shifting the belt off from a step of one cone onto another step of smaller diameter before it is shifted from a step on the other cone to a step of larger diameter, whereby I avoid any strain or undue tension on the belt, and enable its shifting to be more readily accomplished.

The invention consists in the combination, with a pair of reversely-set step-cone pulleys and a belt driving from one to the other, of a belt-shipper consisting of a bar or rod having forks at opposite ends engaging with said belt, a zigzag or serpentine guide to which the belt-shipper is fitted, and a hand-lever whereby the belt-shipper may be shifted along said zigzag or serpentine guide. By this combination of mechanism one end of the belt-shipper and one fork attached thereto will be shifted ahead or in advance of the other end and fork, or the two ends and forks of the belt-shipper will be moved alternately, so that one end and fork will shift the belt from a step of one cone onto a step of smaller diameter before the other fork shifts the belt from a step on the other cone to a step of larger diameter.

The invention also consists in a pair of reversely-set stepped-cone pulleys having inclined or beveled shoulders between the steps, so that the belt may be more readily run from one step onto another of larger diameter, in combination with a belt-shipper and a hand-lever for operating said shipper.

In the accompanying drawings, Figure 1 is a plan of mechanism embodying my invention, and Fig. 2 is a longitudinal section thereof on the plane of the dotted line $x\ x$, Fig. 1.

Similar letters of reference designate corresponding parts in both figures.

A A designate the two side frames of the machine, which, for example, may be a wood-planing machine, and B B' designate a pair of reversely-set stepped-cone pulleys arranged transversely to the side frames, and supported in suitable bearings attached to the side frames.

I will suppose that the stepped-cone pulley B is the driver, and receives rotary motion from any suitable shaft through a belt run upon the pulley B*, and this cone-pulley B, through a belt, $B^2$, transmits rotary motion to the cone-pulley B', which is supposed to be the driven pulley. I have represented on the shaft of the cone-pulley B' a pulley, $B^3$, over which a belt may pass to transmit motion to the feed-rolls of the planing-machine, or to any other shaft which it is desirable to drive at a variable and regulated speed.

The belt-shipper C consists of a bar extending transversely between the cone-pulleys B B', and having at opposite ends shipper-forks $c$, which embrace the belt $B^2$ and by their movement shift the same from one to another of the steps $b\ b'$ on the two cone-pulleys B B'. I have here represented the shoulders between the several steps $b\ b'$ on the two cone-pulleys as inclined or beveled, as shown at $b^*$, so that the belt $B^2$ may be more readily shifted from a step $b$ or $b'$ to another step of larger diameter, the inclined or bevel shoulder, $b^*$, enabling the belt to pass much more readily from one step to another.

Extending parallel with the cone-pulleys B B', and arranged between the same, is a serpentine or zigzag guide, which, as here shown, consists of a straight bar, D, having formed in it a serpentine or zigzag slot, $d$. The belt-shipper C is arranged transversely to the guide D, and has in it pins or projections $c'$, which enter the serpentine or zigzag slot $d$. As here represented, the shipper-bar C also has secured in it other pins, $c^2$, which embrace between them the guide D, and serve to steady the shipper-bar in its movements; but these guide-pins $c^2$ are not indispensable to my invention.

E designates the shipper-lever, which is fulcrum e l at $e$ to a supporting bar, F, extending transversely across the machine, and which has at its outer end a handle, $e'$, whereby it may be swung on its fulcrum $e$. At its inner end the shipper-lever E has a slot, $e^2$, which engages with a projection on the shipper-bar. As here shown, this projection is formed by a prolongation of one of the pins or studs $c'$, with which the shipper-bar is provided. The arrangement of the studs or pins $c'$ in the shipper-bar with relation to the serpentine groove or guide $d$ should be such that when one pin or stud $c'$ is in a portion of the groove or guide having the greatest projection toward one side of the bar D the other pin or stud will be in a portion of the groove or guide which has its greatest projection toward the other side of the bar D; hence it will be seen that when the shipper-bar C is moved lengthwise of the groove or guide $d$ the formation of said groove or guide will impart to one pin $c'$ a movement in one direction transversely to the length of the groove or guide, and will impart to the other pin $c'$ a movement in an opposite direction transversely to the length of the groove or guide. Consequently the two ends of the shipper-bar C will be alternately advanced, as indicated by the dotted lines in Fig. 1, and whether the said bar be moved in one direction or the other along the guide D one or other of its ends and forks $c$ will be moved ahead of the other end and fork. Consequently the belt $B^2$ will, in shifting it, always be moved from a step of one cone-pulley onto a step of smaller diameter before it is moved from a step of the other cone-pulley onto a step of larger diameter. The belt $B^2$, therefore, will not be subjected to any injurious stretching or tension during its shifting from one to another of the steps of the cone-pulleys.

What I claim as my invention, and desire to secure by Letters Patent, is—

1. The combination, with a pair of reversely-set stepped-cone pulleys, and a belt driving from one to the other of them, of a belt-shipper consisting of a bar having shipper-forks at its opposite ends engaging the belt, a zigzag or serpentine guide to which the belt-shipper is fitted, and a hand-lever connected with the belt-shipper and serving to move the same along said serpentine or zigzag guide, whereby in moving the belt-shipper one end and fork will be moved in advance of the other in order to shift the belt from a step of one cone-pulley onto a step smaller in diameter before it is shifted from a step of the other cone-pulley onto a step larger in diameter, substantially as herein described.

2. A pair of reversely-set stepped-cone pulleys having inclined or bevel shoulders joining their steps, in combination with a belt driving from one to the other of them, a belt-shipper, and a hand-lever for operating the belt-shipper, substantially as and for the purpose herein described.

WM. H. GRAY.

Witnesses:
HENRY J. OLDRING, Jr.
THEO. L. C. HOWE.